(12) United States Patent
Mendoza (10) Patent No.: US 10,260,245 B2
(45) Date of Patent: Apr. 16, 2019

(54) TOOL FOR MARKING AND MEASURING STRUTS FOR CONSTRUCTION

(71) Applicant: Juan Mendoza, Temecula, CA (US)

(72) Inventor: Juan Mendoza, Temecula, CA (US)

( * ) Notice: Subject to any disclaimer, the term of this patent is extended or adjusted under 35 U.S.C. 154(b) by 200 days.

(21) Appl. No.: 15/368,801

(22) Filed: Dec. 5, 2016

(65) Prior Publication Data

US 2018/0155941 A1 Jun. 7, 2018
US 2018/0334819 A9 Nov. 22, 2018

(51) Int. Cl.
*G01B 3/04* (2006.01)
*G01B 5/00* (2006.01)
*G01C 9/02* (2006.01)
*E04G 21/18* (2006.01)

(52) U.S. Cl.
CPC ........... *E04G 21/1891* (2013.01); *G01B 3/04* (2013.01); *G01B 5/0004* (2013.01); *G01C 9/02* (2013.01)

(58) Field of Classification Search
CPC .............................. E04G 21/1891; G01C 9/02
USPC ........................................................ 33/451
See application file for complete search history.

(56) References Cited

U.S. PATENT DOCUMENTS

| | | | | |
|---|---|---|---|---|
| 705,867 A * | 7/1902 | Richardson | .............. | G01C 9/28 33/451 |
| 1,915,924 A * | 6/1933 | Coe | ........... | B23D 21/02 24/279 |
| 3,209,459 A * | 10/1965 | Fish, Jr. | ................ | B23D 51/025 33/529 |
| 3,811,356 A * | 5/1974 | Wyler | ....................... | B27G 5/02 30/289 |
| 3,935,779 A * | 2/1976 | Hildebrandt | ............. | B27G 5/02 83/762 |
| 4,653,195 A * | 3/1987 | Esparza | .................... | B23K 7/10 266/64 |
| 4,945,648 A * | 8/1990 | Roth | ..................... | B26B 29/063 33/529 |
| 4,947,616 A * | 8/1990 | Sorton | .................. | E04B 1/2612 33/613 |
| 5,361,504 A * | 11/1994 | Huang | ................. | B25H 1/0085 33/334 |
| 5,450,677 A * | 9/1995 | Casey | .................... | B25H 7/005 33/373 |
| 7,059,059 B1 * | 6/2006 | Ames | ........................ | G01C 9/28 33/372 |
| 2005/0055840 A1* | 3/2005 | Launius, Jr. | ............ | B23B 47/28 33/562 |
| 2006/0123645 A1* | 6/2006 | Gorgone | ............. | E04G 21/1808 33/451 |
| 2006/0123646 A1* | 6/2006 | McRae | ................... | B43L 7/007 33/451 |
| 2018/0155941 A1* | 6/2018 | Mendoza | ................. | G01C 9/02 |

* cited by examiner

*Primary Examiner* — Yaritza Guadalupe (57) ABSTRACT

A tool shaped in a U-shape for accepting a standard U strut. The tool has opening for marking the strut for cutting purposes and hole openings for marking the center of standard struts.

31 Claims, 6 Drawing Sheets

TOOL FOR MARKING AND MEASURING STRUTS FOR CONSTRUCTION

BACKGROUND OF THE INVENTIVE FIELD

The present invention is directed to tool for marking struts for cutting and installation. More specifically, the present invention relates to a tool to mark, level, and ultimately prepare strut channels for installation.

In the past, tools such as a square layout tool were used to mark the strut channels, but these traditional methods were inefficient and many times these tools led to inaccurate cuts and wasted materials.

SUMMARY OF THE GENERAL INVENTIVE CONCEPT

The present invention relates to a unique tool design to mark, level, and ultimately prepare struts for installation. The present invention provides precision marking for accurate cuts. Its multi-functional design was established by inserting strategic markings and cut-out or openings into the tool to allow users in the construction industry to easily and efficiently mark, level, measure, and install strut channels.

In the preferred embodiment, the present invention is comprised of: a tool for marking struts, comprising: a U-shaped body having a first side wall, a second side wall, and a bottom wall, the U-shaped body adapted to accept a strut; a first V-shaped opening in the first side wall for marking the strut with a first triangular marking when the strut is to be bent in a 90 degree angle; a second V-shaped opening in the second side wall located opposite to the first V-shaped opening for marking the strut with a second triangular marking when the strut is to be bent in a 90 degree angle; a third V-shaped opening in the first side wall for marking the strut with a third triangular marking when the strut is to be bent in a 45 degree angle; a fourth V-shaped opening in the second side wall located opposite to the third V-shaped opening for marking the strut with a fourth triangular marking when the strut is to be bent in a 45 degree angle; a first hole in the first side wall for marking a center of a side of a standard strut; a second hole in the second side wall located opposite to the first hole for marking a center of another side of a standard strut; a first leveler positioned to ensure that the strut is horizontally level; wherein the bottom wall is further comprised of: a plurality of magnets for holding the tool securely to the strut; wherein the first and second side walls have a first end and a second end; wherein the first ends of the first and second side wall are angled at a 45 degree angle; wherein the second ends of the first and second side wall are a straight edge.

The foregoing and other features and advantages of the present invention will be apparent from the following more detailed description of the particular embodiments, as illustrated in the accompanying drawings.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

The following detailed description of the example embodiments refers to the accompanying figures that form a part thereof. The detailed description provides explanations by way of exemplary embodiments. It is to be understood that other embodiments may be used having mechanical and electrical changes that incorporate the scope of the present invention without departing from the spirit of the invention.

Figure 1:
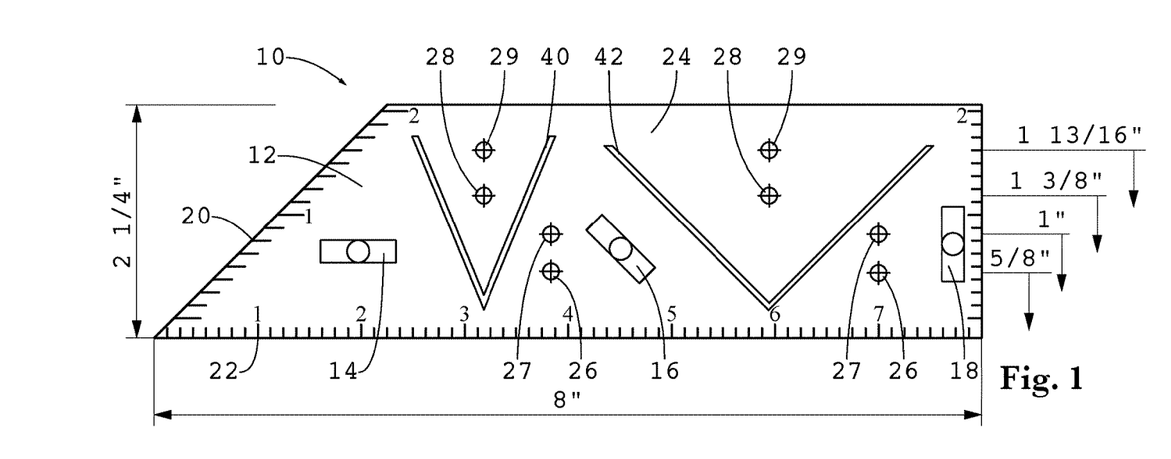
FIG. 1 illustrates a side view of one embodiment of the present invention.

FIG. 1 illustrates a side view of one embodiment of the present invention 10 (U-Square) portraying the fundamental functions of the device. The main body 12 of the tool contains specific cuts into metal or hard non-metal material for purposes of marking and measuring strut channels. This view also demonstrates the multi-functional abilities including levelers and ruler markings for measurement. The levelers 14, 16, 18 are placed strategically to guide a user in creating angles and making sure the angles are level—including 0°, 45°, 90° angles, respectively.

The preferred embodiment of the tool of the present invention is in a U shape having two side walls and a bottom wall. See FIG. 2. A strut can be positioned in the space formed by the U shape of the tool to allow the user to mark or cut the strut as needed. The two sides walls can be configured with matching levelers, cut-out opening portions and marking holes as described herein (matching means they are located opposite to each other on the side walls). In other words, both side walls have the ability to level, mark and guide the user for making cuts. See, FIG. 3 and FIG. 4. In another embodiment, only one side wall is configured with the levelers, cut-out openings, and or marking holes.

The alignment is listed below with its affiliated leveler:

The first leveler 14 is to ensure that the strut or general objects are leveled horizontally.

The second leveler 16 is to ensure the finished cut and bent strut or general objects are leveled at a 45° angle.

The third leveler 18 is to demonstrate the finished cut strut or general objects are leveled at a vertical angle In one embodiment, the tool has an angled end 20 on one side at a 45-degree angle. This 45° end is comprised of a ruler and is used to determine various strut heights for any item needing a 45-degree angle cut.

A bottom edge of the side wall of the tool of the present invention has a ruler 22 to allow the user to perform measurements as needed for general use. One side wall of the tool has a ruler measured in inches. The bottom edge of the other side wall of the tool (not shown in FIG. 1) includes a ruler in the metric system.

The tool of the present invention is comprised of various holes in the side walls 24 that are used to mark the side-center of a strut (for various standard size struts, including half struts, basic struts, deep struts, and tall struts). For example, when the strut is positioned in the U shape of the tool, the holes can be used to mark the side-center of the strut. Holes 26 are preferably ⅛" holes, each positioned at ⅝ of an inch from the bottom wall up, to indicate the side-center of a half strut at ⅞ of an inch. Holes 27 are preferably ⅛" holes, each positioned at 1 inch from the bottom wall up, to indicate the side-center of a basic strut at 1⅝ an inch. Holes 28 are preferably ⅛" holes, each positioned at 1⅜ of an inch from the bottom wall up, to indicate the side-center of the deep strut at 2⁷⁄₁₆ of an inch. Holes 29 are preferably ⅛" holes, each positioned at 1¹³⁄₁₆ inches from the bottom wall up, to indicate the side-center of a tall strut at 3¼ inches. In this illustration, the holes are specifically designed to mark the side center of various standard struts typically used in the profession.

The present invention has cut-out or opening portions in the side walls strategically placed to allow the user to easily and accurately mark the strut with a line or location indicating where to cut the strut and make it into its intended angle. The V-shaped ⅛" opening 40 has a 45 degree angle. The V-shaped opening 42 has a 90 degree angle. For example, the V-shaped cut-outs or openings are placed at a first location 40 for marking the struts (mark a triangle shape) for cutting in order to make a 45-degree angle in the strut. In other words, when the struts are cut according to the markings made by the opening 40, the struts are joined (e.g., by bending) at the cut locations to create a 45-degree angle. The V-shaped openings at the second location 42 are designed to create a 90-degree angle. These are the two most commonly used angles in the industry. By changing the angles of the V-shaped opening portions, the tool can be used to cut struts for various other angles.

Figure 2:
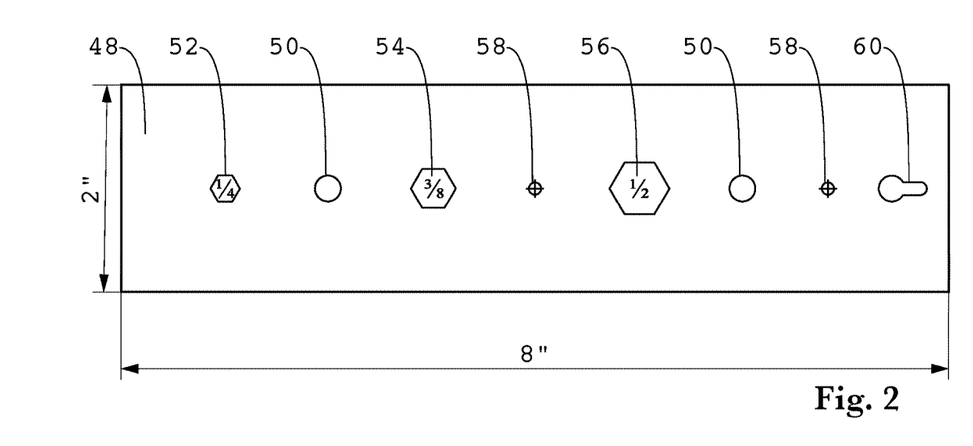
FIG. 2 Illustrates one embodiment of a bottom wall of the tool of the present invention.

FIG. 2 Illustrates one embodiment of a bottom wall 48 of the tool of the present invention. Magnets 50 located on the bottom wall help secure the tool to a strut or other object when in use. In one embodiment, they are ⅜ inch magnets. These magnets will secure the tool to the strut when enveloped around the strut. The purpose of the magnets is to prevent sliding while the user creates the marks. The secure fastening allows for easier and more accurate measurements and marking.

There are various hexagon nut holes located on the bottom wall for engaging nuts or bolts of various sizes. A ¼ inch hexagon nut hole 52 can be used to hold, loosen or tighten ¼ inch nuts or bolts. A ⅜ inch hexagon nut hole 54 can be used to hold, loosen or tighten ⅜ inch nuts or bolts. A ½ inch hexagon nut hole 56 can be used to hold, loosen or tighten ½ inch nuts or bolts. These nut holes are specifically designed for additional functionality allowing the user to hold hex nut bolts in place while securing hardware. The sizes illustrated are standard sizes used in industry.

Holes 58 can also be placed on the bottom wall (e.g., ⅛ inch holes) designed to allow the user to mark the back center of a standard channel strut. A keyhole hanger 60 can also be placed on the bottom wall of the tool to secure and store the U-Square tool of the present invention.

Figure 3:
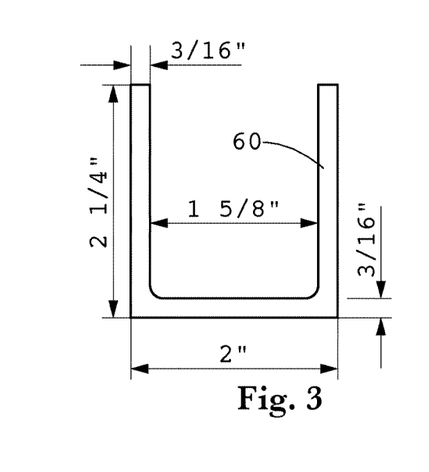
FIG. 3 illustrates a view of one end of the tool of the present invention.

FIG. 3 illustrates a view of one end 60 of the tool of the present invention. As depicted, the tool is preferably in a U-shape to securely hold U-struts in place for secure marking, measuring or cutting.

Figure 4:
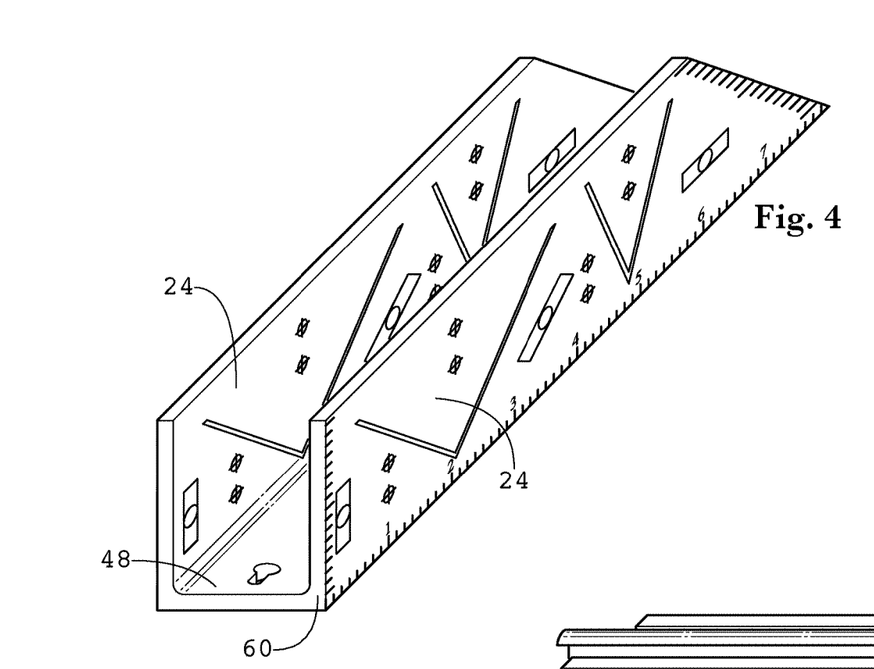
FIG. 4 illustrates a perspective view of one embodiment of the tool of the present invention.

FIG. 4 illustrates a perspective view of one embodiment of the tool of the present invention. As depicted, the side walls and bottom wall form a U-shaped tool for accepting a strut.

Figure 5A:
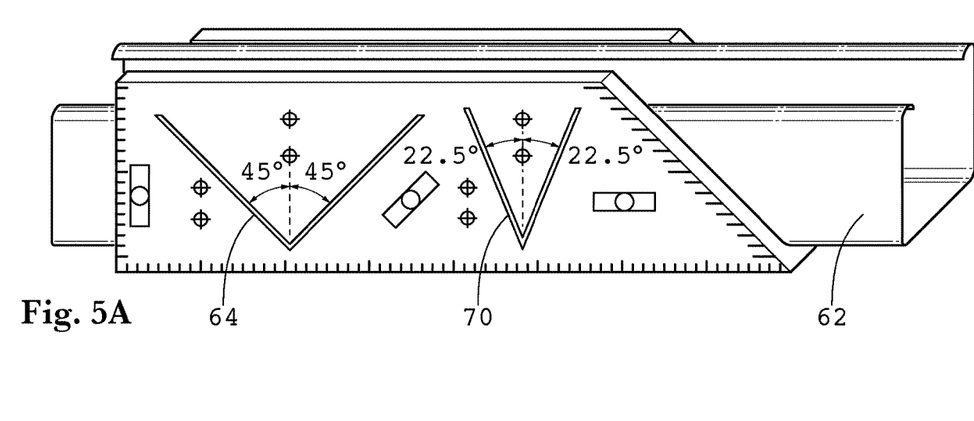
FIG. 5A illustrates one embodiment of the tool of the present invention holding a strut.
Figures 5B, 5C:
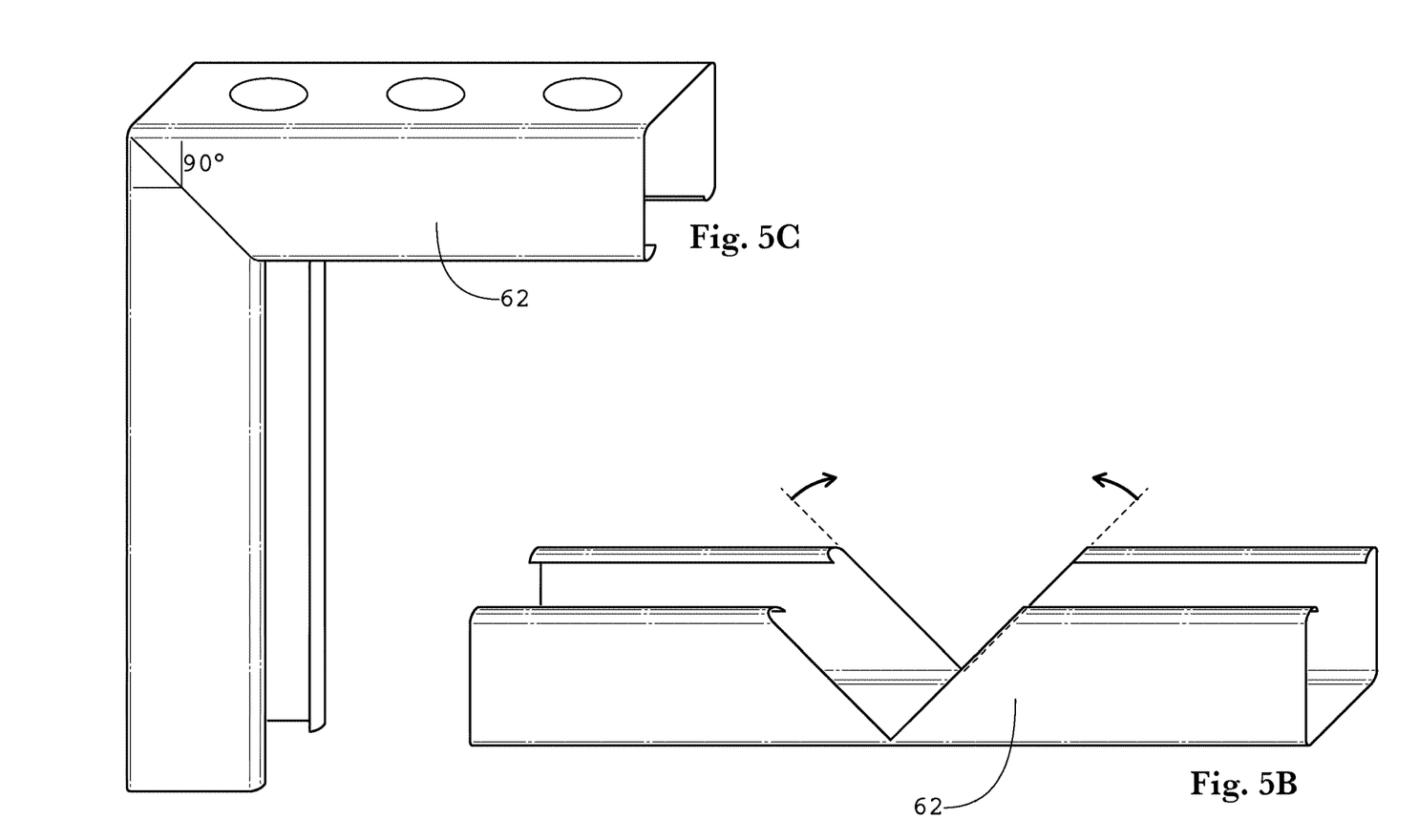
FIG. 5B illustrates a strut with the triangular shapes removed after the strut is cut.
FIG. 5C illustrates the final product—a strut folded into a 90-degree angle.

FIG. 5A illustrates one embodiment of the tool of the present invention holding a strut 62. A user can use the wider V-shaped cut-outs 64 to mark the strut at a location to cut the strut at an angle for creating a 90-degree angle in the strut. FIG. 5B illustrates how to utilize the wide V slot to create a 90-degree fold in the strut. By placing a strut inside the U-Square tool of the present invention, the magnets secure it in place and prevent movement so the user can mark the strut. Once the strut is marked using the V-shaped cut-out, the user can cut out the triangular shape and fold the strut thus creating a 90-degree angle. FIG. 5B illustrates a strut with the triangular shapes removed after the strut is cut. FIG. 5C illustrates the final product—a strut folded into a 90-degree angle.

Figures 6A, 6B:
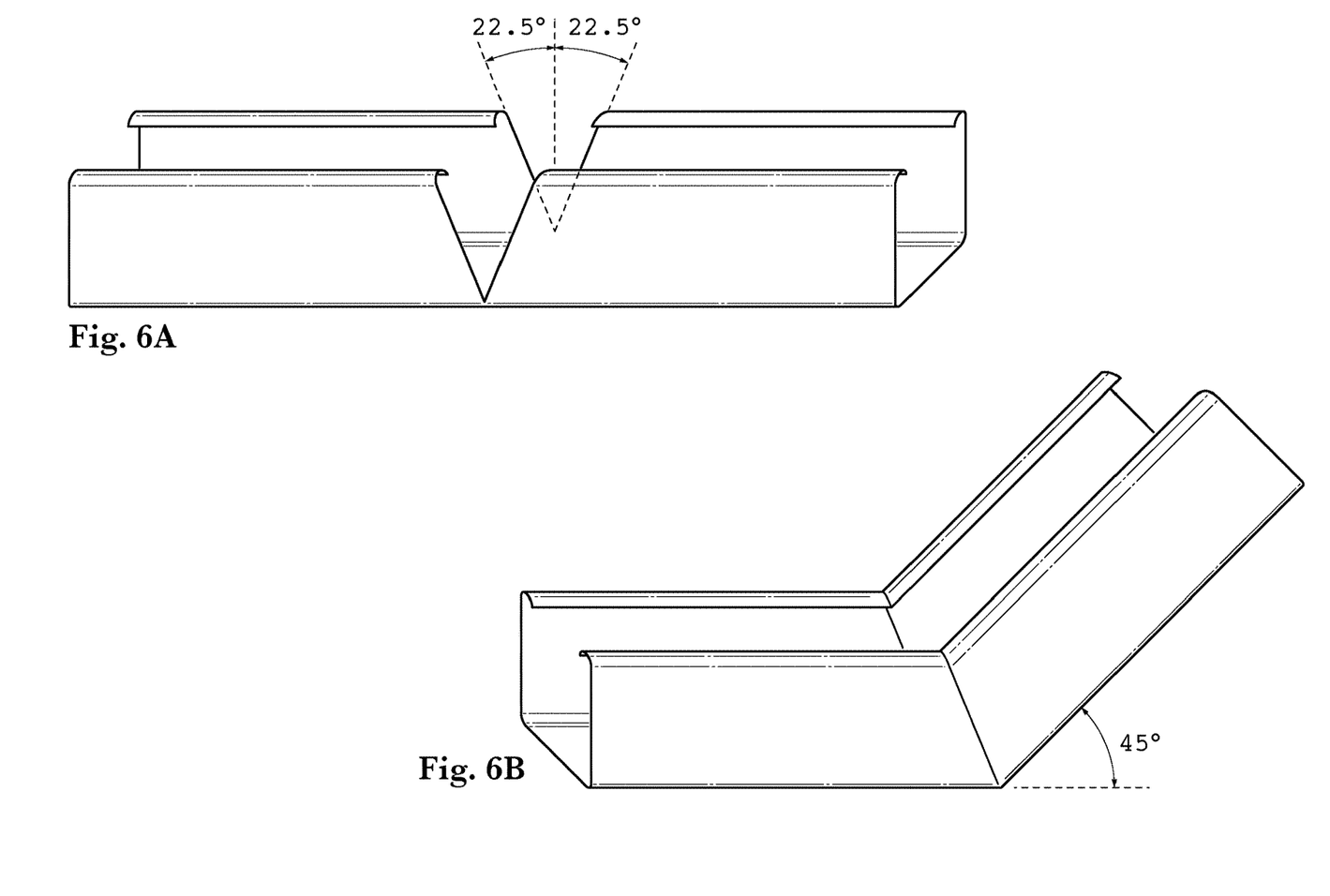
FIG. 6A illustrates the strut with the triangular shape cut out of the strut.
FIG. 6B illustrates the strut bent to form a 45-degree angle.

FIGS. 6A and 6B illustrate how to utilize the narrower V slot opening 70 to create a 45-degree fold in the strut. By placing a strut inside the U-Square tool of the present invention, the magnets secure it in place and prevent movement so the user can mark the strut. Once the strut is marked, the user can cut out the triangular shape and fold the strut thus creating a 45-degree angle. FIG. 6A illustrates the strut with the triangular shape cut out of the strut and FIG. 6B illustrates the strut bent to form a 45-degree angle.

Figure 7A:
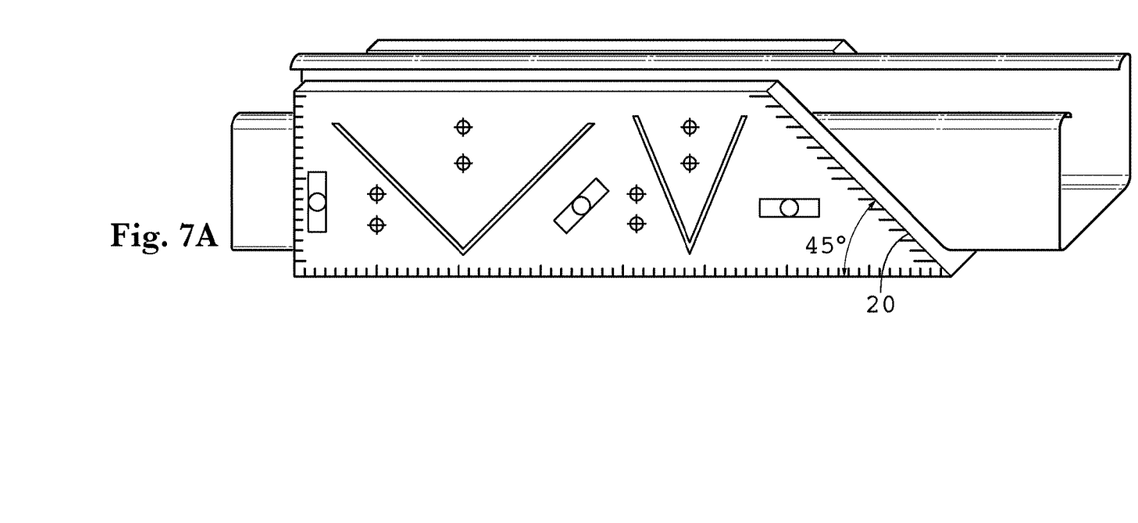
FIG. 7A illustrates a strut positioned inside the U-Square.
Figure 7B:
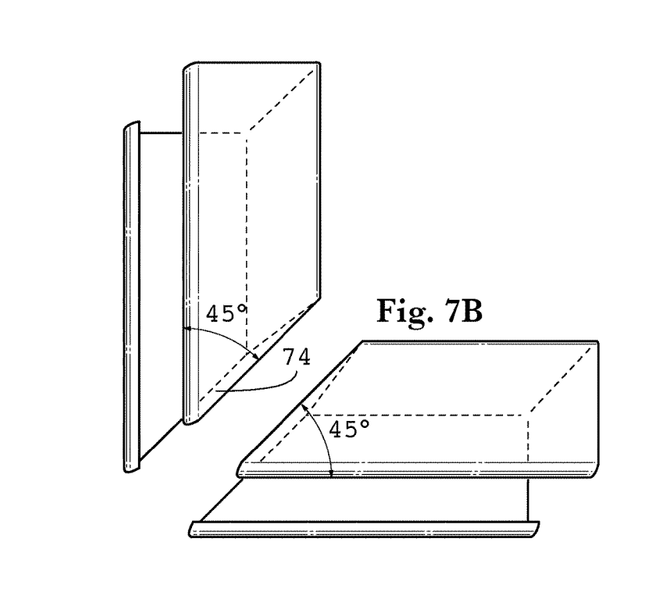
FIG. 7B illustrates a 90 degree angle which is used for outside corners.
Figure 7C:
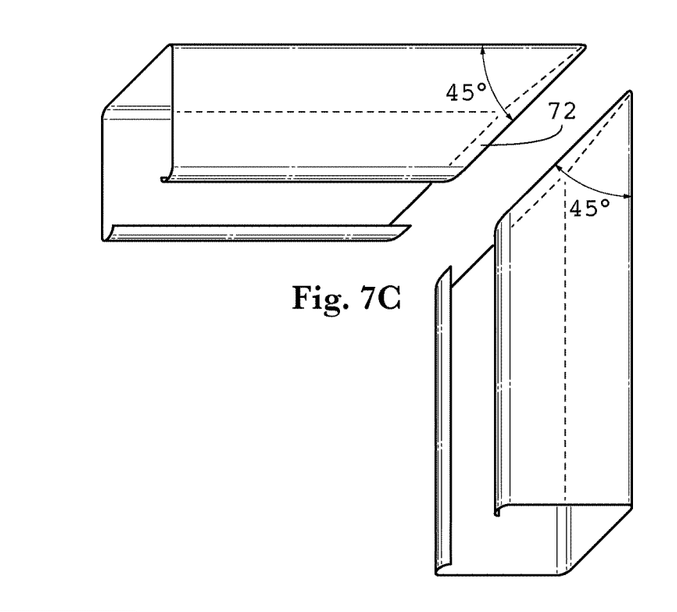
FIG. 7C illustrates a 90 degree angle which is used for inside corners.

FIG. 7A, 7B, 7C illustrate one embodiment of using the tool of the present invention to make inside and outside corner pieces for struts. By placing the strut inside the U-Square tool of the present invention, the user can utilize the angled end 20 to mark the strut. Once cut, the user can slide the two pieces together to form a 90-degree angle, which can be used for both inside 72 and outside 74 corners. FIG. 7A illustrates a strut positioned inside the U-Square. FIG. 7B illustrates a 90 degree angle which is used for outside corners. FIG. 7C illustrates a 90 degree angle which is used for inside corners.

Figure 8A:
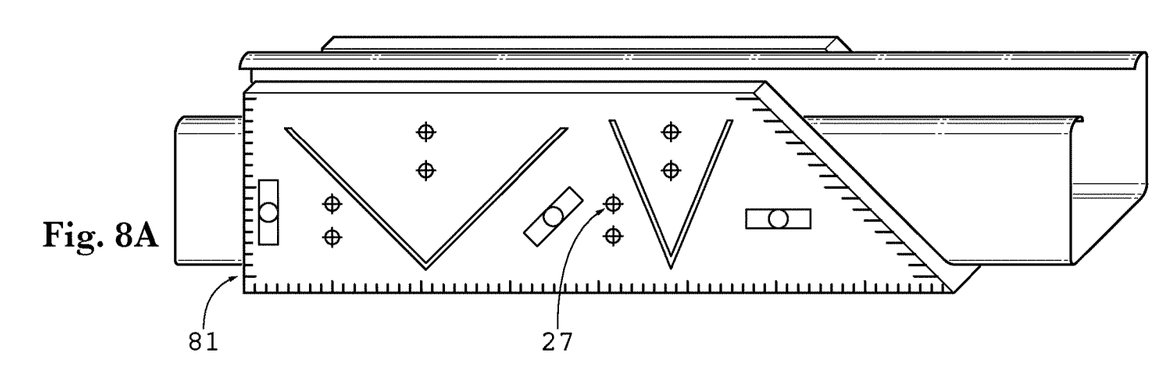
FIG. 8A illustrates one embodiment of the square end of the U-Square tool.
Figure 8B:
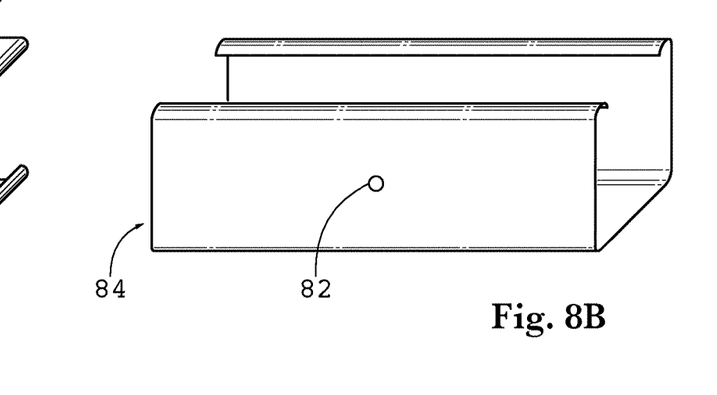
FIG. 8B illustrates one embodiment of a strut having a marking at its center location.
Figure 8C:
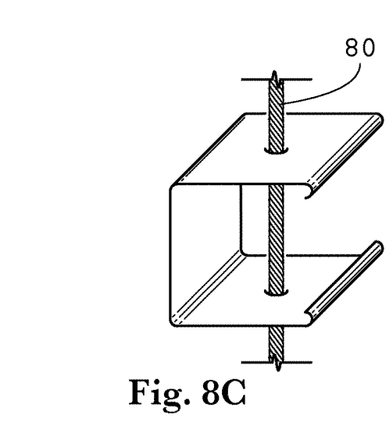
FIG. 8C illustrates a strut with a hole cut in it as marked and fitted with an all-thread hardware component.

FIG. 8A, 8B, 8C illustrates the function of the small holes that occupy both sides of the U-Square tool of the present invention. The hole the user selects will depend on the strut size being used and marked. For example, if the user selects a 1⅝ inch strut, then the user would select the appropriate hole 27 on the tool (as shown in FIG. 8A) to mark the side-center of the 1⅝ strut. ("Side-center" means the center of a side of a strut). Once the strut has been marked on both sides (matching holes located on both side walls of the tool of the present invention), the user can drill a hole through the strut to house hardware 80 to secure the strut in place.

FIG. 8A illustrates one embodiment of the square end 81 of the U-Square tool that allows the user to mark the strut in its entirety thus allowing the user to cut the strut in a precise line. FIG. 8B illustrates one embodiment of a strut having a marking at its side-center location 82 and edges having a straight cut 84 as marked by the tool of the present invention. FIG. 8C illustrates a strut with a hole cut in it as marked and fitted with an all-thread hardware component.

While certain embodiments of the present invention are described in detail above, the scope of the invention is not to be considered limited by such disclosure, and modifications are possible without departing from the spirit of the invention as evidenced by the following claims:

What is claimed is:

1. A tool for marking struts, comprising:
   a U-shaped body having a first side wall, a second side wall, and a bottom wall, the U-shaped body adapted to accept a strut;
   a first V-shaped opening having a 90 degree angle in the first side wall for marking the strut with a first triangular marking when the strut is to be bent in a 90 degree angle;
   a second V-shaped opening having a 90 degree angle in the second side wall located opposite to the first V-shaped opening for marking the strut with a second triangular marking when the strut is to be bent in a 90 degree angle;
   wherein the first and second V-shaped openings are positioned on the U-shaped body for marking the strut with matching V-shaped lines indicating where the strut should be cut to allow the strut to be bent in a 90 degree angle;
   wherein the first and second side walls have a first end and a second end;
   wherein at least one of the ends is a straight edge.

2. A tool according to claim 1, further comprising:
   a third V-shaped opening having a 45 degree angle in the first side wall for marking the strut with a third triangular marking when the strut is to be bent in a 45 degree angle.

3. A tool according to claim 2, further comprising:
   a fourth V-shaped opening having a 45 degree angle in the second side wall located opposite to the third V-shaped opening for marking the strut with a fourth triangular marking when the strut is to be bent in a 45 degree angle;
   wherein the third and fourth V-shaped openings are positioned on the U-shaped body for marking the strut with matching V-shaped lines indicating where the strut should be cut to allow the strut to be bent in a 45 degree angle.

4. A tool according to claim 1, further comprising:
   a first hole in the first side wall for marking a center of a side of a half strut.

5. A tool according to claim 4, further comprising:
   a second hole in the second side wall located opposite to the first hole for marking a center of another side of a half strut.

6. A tool according to claim 1, further comprising:
   a third hole in the first side wall for marking a center of a side of a standard basic strut.

7. A tool according to claim 6, further comprising:
   a fourth hole in the second side wall located opposite to the third hole for marking a center of another side of a standard basic strut.

8. A tool according to claim 1, further comprising:
   a fifth hole in the first side wall for marking a center of a side of a deep strut.

9. A tool according to claim 8, further comprising:
   a sixth hole in the second side wall located opposite of the fifth hole for marking a center of a side of a deep strut.

10. A tool according to claim 1, further comprising:
    a first leveler positioned to ensure that the strut is horizontally level.

11. A tool according to claim 1, further comprising:
    a second leveler positioned to ensure that the strut is level at a 45 degree angle.

12. A tool according to claim 1, further comprising:
    wherein the first ends of the first and second side wall are angled at a 45 degree angle;
    wherein the second ends of the first and second side wall are a straight edge.

13. A tool according to claim 1, wherein the bottom wall is further comprised of:
    a plurality of magnets for holding the tool securely to the strut.

14. A tool according to claim 1, wherein the bottom wall is further comprised of:
    a plurality of hexagon nut holes for engaging nuts or bolts of various sizes.

15. A tool according to claim 1, wherein the bottom wall is further comprised of:
    at least one hole for marking the center of a back wall of a strut.

16. A tool according to claim 1, further comprising a ruler on the first side wall.

17. A tool according to claim 1, further comprising:
    an eighth hole in the second side wall located opposite of the seventh hole for marking a center of a side of a tall strut.

18. A tool according to claim 17, further comprising:
    an eighth hole in the second side wall located opposite of the seventh hole for marking a center of a side of a tall strut.

19. A tool for marking struts, comprising:
    a U-shaped body having a first side wall, a second side wall, and a bottom wall, the U-shaped body adapted to accept a strut;
    a first V-shaped opening having a 90 degree angle in the first side wall for marking the strut with a first triangular marking when the strut is to be bent in a 90 degree angle;
    a second V-shaped opening having a 90 degree angle in the second side wall located opposite to the first V-shaped opening for marking the strut with a second triangular marking when the strut is to be bent in a 90 degree angle;
    wherein the first and second V-shaped openings are positioned on the U-shaped body for marking the strut with matching V-shaped lines indicating where the strut should be cut to allow the strut to be bent in a 90 degree angle.

20. A tool according to claim 19, further wherein the first and second side walls have a first end and a second end;
    wherein the first ends of the first and second side wall are angled at a 45 degree angle;
    wherein the second ends of the first and second side wall are a straight edge.

21. A tool according to claim 19, further comprising:
    a third V-shaped opening having a 45 degree angle in the first side wall for marking the strut with a third triangular marking when the strut is to be bent in a 45 degree angle.

22. A tool according to claim 21, further comprising:
    a fourth V-shaped opening having a 45 degree angle in the second side wall located opposite to the third V-shaped opening for marking the strut with a fourth triangular marking when the strut is to be bent in a 45 degree angle;
    wherein the third and fourth V-shaped openings are positioned on the U-shaped body for marking the strut with matching V-shaped lines indicating where the strut should be cut to allow the strut to be bent in a 45 degree angle.

23. A tool according to claim 19, further comprising:
a first hole in the first side wall for marking a center of a side of a half strut.

24. A tool according to claim 23, further comprising:
a second hole in the second side wall located opposite to the first hole for marking a center of another side of a half strut.

25. A tool according to claim 19, further comprising:
a third hole in the first side wall for marking a center of a side of a standard basic strut.

26. A tool according to claim 25, further comprising:
a fourth hole in the second side wall located opposite to the third hole for marking a center of another side of a standard basic strut.

27. A tool according to claim 19, further comprising:
a fifth hole in the first side wall for marking a center of a side of a tall strut.

28. A tool according to claim 27, further comprising:
a sixth hole in the second side wall located opposite of the fifth hole for marking a center of a side of a tall strut.

29. A tool according to claim 19, further comprising:
a first leveler positioned to ensure that the strut is horizontally level.

30. A tool according to claim 19, wherein the bottom wall is further comprised of:
a plurality of magnets for holding the tool securely to the strut.

31. A tool for marking struts, comprising:
a U-shaped body having a first side wall, a second side wall, and a bottom wall, the U-shaped body adapted to accept a strut;
a first V-shaped opening having a 90 degree angle in the first side wall for marking the strut with a first triangular marking when the strut is to be bent in a 90 degree angle;
a second V-shaped opening having a 90 degree angle in the second side wall located opposite to the first V-shaped opening for marking the strut with a second triangular marking when the strut is to be bent in a 90 degree angle;
wherein the first and second V-shaped openings are positioned on the U-shaped body for marking the strut with matching V-shaped lines indicating where the strut should be cut to allow the strut to be bent in a 90 degree angle;
a third V-shaped opening having a 45 degree angle in the first side wall for marking the strut with a third triangular marking when the strut is to be bent in a 45 degree angle;
a fourth V-shaped opening having a 45 degree angle in the second side wall located opposite to the third V-shaped opening for marking the strut with a fourth triangular marking when the strut is to be bent in a 45 degree angle;
wherein the third and fourth V-shaped openings are positioned on the U-shaped body for marking the strut with matching V-shaped lines indicating where the strut should be cut to allow the strut to be bent in a 45 degree angle;
a first hole in the first side wall for marking a center of a side of a standard strut;
a second hole in the second side wall located opposite to the first hole for marking a center of another side of a standard strut;
a first leveler positioned to ensure that the strut is horizontally level;
wherein the bottom wall is further comprised of:
a plurality of magnets for holding the tool securely to the strut;
wherein the first and second side walls have a first end and a second end;
wherein the first ends of the first and second side wall are angled at a 45 degree angle;
wherein the second ends of the first and second side wall are a straight edge.

* * * * *